United States Patent [19]

Lebret

[11] Patent Number: 5,167,495
[45] Date of Patent: Dec. 1, 1992

[54] RECIPROCATING HYDRAULIC PUMP

[75] Inventor: Pierre Lebret, Le Chesnay, France

[73] Assignee: Bendix Europe Services Techniques, Drancy, France

[21] Appl. No.: 726,670

[22] Filed: Jul. 8, 1991

[30] Foreign Application Priority Data

Jul. 26, 1990 [FR] France .................. 90 09560

[51] Int. Cl.⁵ .............................. F04B 7/04
[52] U.S. Cl. ..................... 417/490; 417/495; 417/554
[58] Field of Search ............. 417/495, 554, 490, 493

[56] References Cited

U.S. PATENT DOCUMENTS

| | | | |
|---|---|---|---|
| 2,081,056 | 5/1937 | Loweke | 417/554 |
| 2,193,020 | 3/1940 | Collins | 417/495 |
| 2,230,622 | 2/1971 | L'Orange | 417/495 |
| 2,696,788 | 12/1954 | Funston | 103/42 |
| 3,058,455 | 10/1962 | Hofer | 417/495 |
| 3,357,363 | 12/1967 | Raymond | 417/495 |
| 3,578,881 | 5/1971 | Mowbray | 417/495 |
| 4,792,096 | 12/1988 | Gregory | 417/554 |

FOREIGN PATENT DOCUMENTS 327218 8/1989 European Pat. Off. .
115392 12/1898 Fed. Rep. of Germany .

Primary Examiner—Richard A. Bertsch
Assistant Examiner—Peter Korytnyk
Attorney, Agent, or Firm—Larry J. Palguta; Ken C. Decker

[57] ABSTRACT

A hydraulic pump comprises at least one reciprocating piston (2) sliding in a stationary cylinder (4), a non-return suction valve (12) arranged between a source of fluid under low pressure and a working chamber (10) defined in the cylinder (4), and a first non-return delivery valve (16) arranged between the working chamber (10) and an outlet chamber (14) for the fluid under high pressure. A conduit (24) connects the outlet chamber (14) and the working chamber (10), the piston (2) leaving this conduit (24) open at the end of the suction period and at the start of the delivery period and closing it during the rest of the cycle.

4 Claims, 2 Drawing Sheets

RECIPROCATING HYDRAULIC PUMP

BACKGROUND OF THE INVENTION

The present invention relates to a hydraulic pump comprising at least one reciprocating piston sliding in a stationary cylinder, this pump comprising, furthermore, a non-return suction valve arranged between a source of fluid under low pressure and a working chamber defined in the cylinder, and a first non-return delivery valve arranged between the working chamber and an outlet chamber for the fluid under high pressure.

Such a pump is commonly used in hydraulic brake circuits comprising particularly a wheel anti-lock system.

U.S. Pat. No. 4,883,327 describes, for example, such a pump in a use as mentioned above. The main disadvantage of pumps of this type is that they generate noise and vibrations essentially at the moment when the pump begins to deliver.

It has been found that the levels of noise and of vibrations largely depend on the filling of the working chamber of the pump and on the pressure prevailing in the outlet chamber of the pump at the start of delivery.

It is known from DE-C-115 392 a double acting pump the power of which is limited by a communication between one of the working chambers in delivery period and the other working chamber in suction period from a given stroke of the piston at both sides of a middle point. This pump does not provide a cramming of a working chamber.

SUMMARY OF THE INVENTION

An object of the present invention is to overcome this disadvantage, without thereby adversely affecting the efficiency of the pump to any appreciable extent.

According to the present invention, a conduit connects the outlet chamber and the working chamber of the pump, this conduit being open at the dead center of the piston at the end of the suction period before the start of the delivery period and closed during the rest of the cycle. Advantageously, the piston controls the closing and the opening of the conduit.

Preferably, a second non-return delivery valve is arranged between the outlet chamber and a circuit using the fluid under high pressure.

Moreover, a restriction is advantageously arranged between this second non-return valve and the user circuit.

BRIEF DESCRIPTION OF THE DRAWING

The invention will now be described by way of example with reference to the accompanying drawing in which.

DETAILED DESCRIPTION OF THE INVENTION

Figure 1:
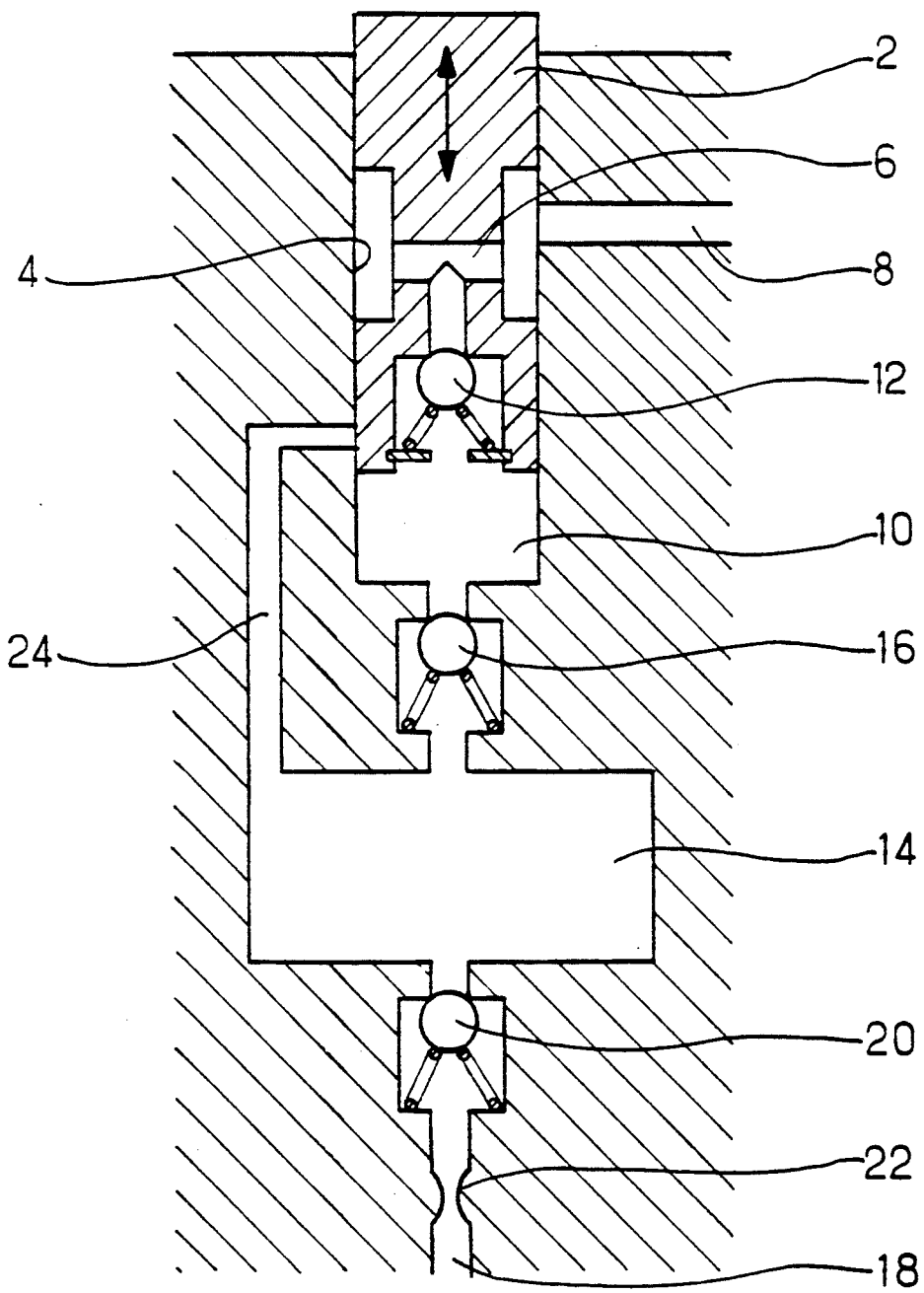
FIG. 1 shows a pump according to the invention diagrammatically in section.

Referring now more particularly to FIG. 1, a piston 2 slides in reciprocating manner in a cylinder 4, for example under the effect of an eccentric cam (not shown) controlled in the conventional way by an electric motor. This piston 2 is equipped with a suitable duct 6 for connecting via a conduit 8 a source of fluid under low pressure (not shown) to a working chamber 10 by means of a non-return suction valve 12.

In the example illustrated, this non-return valve 12 consists of a ball closing the duct 6 under the effect of a spring.

The working chamber 10 communicates with an outlet chamber for fluid under high pressure 14 by means of an non-return delivery valve 16 which, in the example illustrated, likewise consists of a ball loaded by a spring.

A circuit using fluid under high pressure is connected to the outlet conduit 18 which is itself in communication with the outlet chamber 14 by means of a second non-return valve 20 in series with a restriction 22. A conduit 24 connects the outlet chamber 14 and the working chamber 10. This conduit 24 is opened by the piston 2 at the end of the suction period of the pump and at the start of the delivery period, the piston 2 closing the conduit 24 during the rest of the reciprocating operating cycle.

Figure 2:
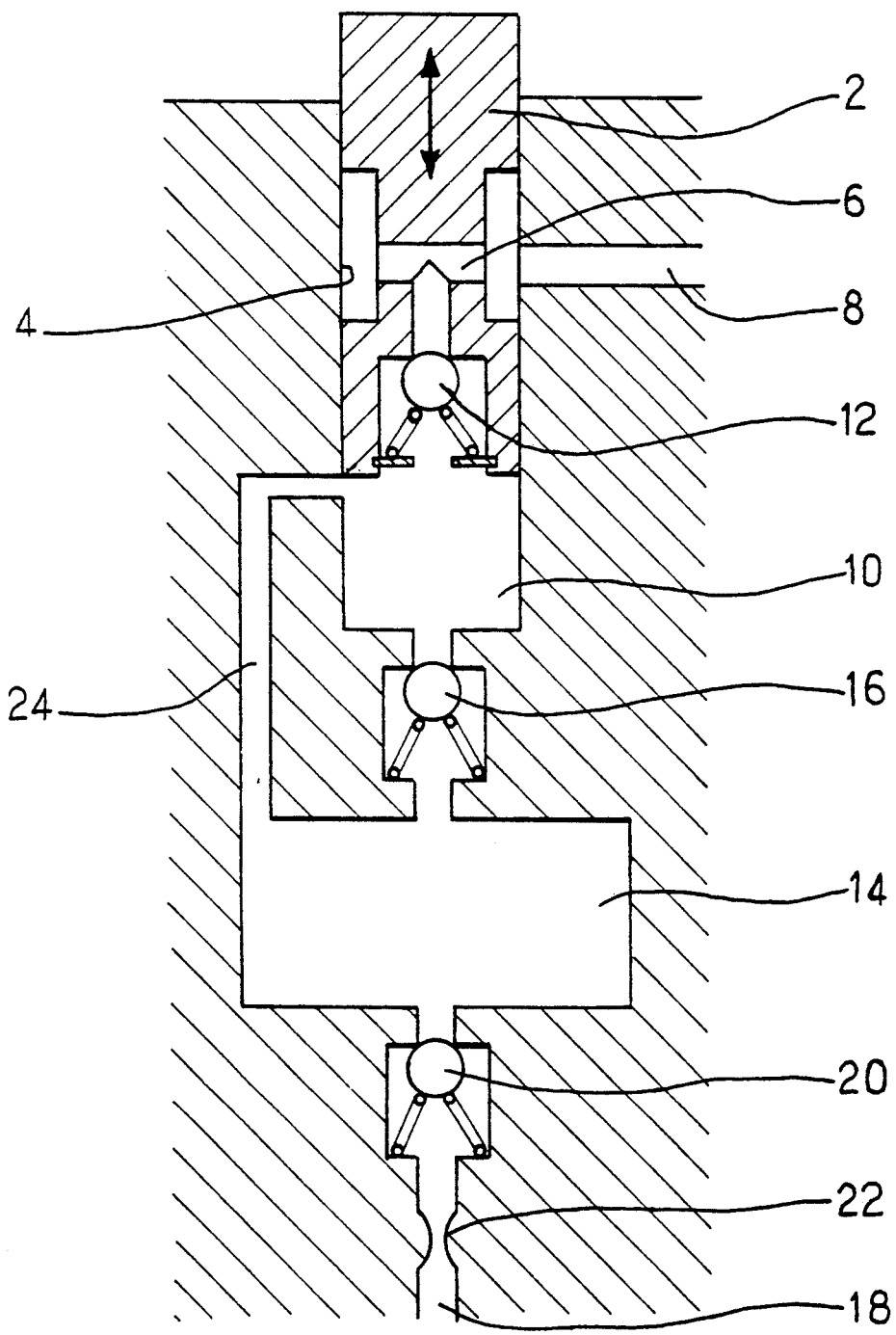
FIG. 2 shows the piston at the top of its stroke.

In other words, the conduit 24 opens into the working chamber 10 in the vicinity of what an average person skilled in the art calls the "bottom dead center" of the pump (at the top of the piston stroke in FIG. 2), that is to say in the vicinity of the point where the piston 2 stops and where its speed changes sign.

The operation of the pump will not be described in detail here for it is considered as known to any engineer. However, it will be found that, at the end of the suction period, the piston 2 opens the conduit 24 and the working chamber 10 is then crammed with fluid under high pressure coming from the outlet chamber 14. Simultaneously, the pressure in this latter chamber 14 decreases slightly. When the piston 4 begins the delivery period, on the one hand the working chamber 10 is completely full and on the other hand the pressure difference between the working chamber 10 and outlet chamber 14 is reduced substantially.

This ensures a considerable reduction of the noises and vibrations occurring as a result of the various jolts in comparison with those of the pump systems not incorporating the invention.

The second non-return valve 20 and the restriction 22 thus advantageously makes it possible to obtain some regulation of the pressure in the user circuit.

Although only one preferred embodiment has been shown, it is clear that many modifications can be made by an average person skilled in the art, without departing from the scope of the present invention, as defined by the accompanying claims.

What we claim is:
1. A hydraulic pump comprising:
   a cylinder provided with an input for fluid under low pressure and with an output of fluid under high pressure and remote from the input,
   a piston provided with an internal duct and with a non-return suction valve, said piston sliding in the cylinder with a reciprocating movement by which the piston is successively moved away from and brought nearer to said output, during respective suction and delivery periods,
   a working chamber defined by the piston in the cylinder, said working chamber being selectively placed in communication with the input through said duct by said non-return suction valve during said suction period,
   an outlet chamber for the fluid under high pressure,
   a non-return delivery valve positioned stationarily between the working chamber and the outlet chamber for establishing a first selective communication between said chambers during said delivery period, and a conduit providing a second selective communication between the working chamber and outlet chamber, said conduit being open at the dead center of the piston which is at the end of the suction period before the beginning of the delivery period and closed thereafter for the rest of the reciprocating movement of the piston.

2. The hydraulic pump according to claim 1, wherein the opening and the closing of said conduit are controlled by said piston.

3. The hydraulic pump according to claim 2, wherein a second non-return delivery valve is arranged between said outlet chamber and a circuit using the fluid under high pressure.

4. The hydraulic pump according to claim 3, wherein a restriction is arranged between said second non-return valve and said circuit using high pressure fluid.

* * * * *